United States Patent
Nagai et al.

(10) Patent No.: US 8,371,126 B2
(45) Date of Patent: Feb. 12, 2013

(54) GAS TURBINE COMBUSTOR

(75) Inventors: Tomoto Nagai, Hyogo (JP); Eigo Katou, Hyogo (JP); Tetsu Konishi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 673 days.

(21) Appl. No.: 12/595,160

(22) PCT Filed: Apr. 11, 2008

(86) PCT No.: PCT/JP2008/057139
§ 371 (c)(1),
(2), (4) Date: Oct. 8, 2009

(87) PCT Pub. No.: WO2008/133034
PCT Pub. Date: Nov. 6, 2008

(65) Prior Publication Data
US 2010/0115966 A1   May 13, 2010

(30) Foreign Application Priority Data

Apr. 13, 2007 (JP) ................................ 2007-106415

(51) Int. Cl.
*F02C 7/20* (2006.01)

(52) U.S. Cl. .......................................... 60/800; 60/740

(58) Field of Classification Search .............. 60/737, 60/738, 740, 742, 746, 748, 758, 800, 39.37, 60/752; 431/278, 283, 285
See application file for complete search history.

(56) References Cited

U.S. PATENT DOCUMENTS

| | | | |
|---|---|---|---|
| 4,485,630 A | 12/1984 | Kenworthy | |
| 6,282,886 B1 | 9/2001 | Sato et al. | |
| 6,357,222 B1 | 3/2002 | Schilling et al. | |
| 7,610,746 B2 * | 11/2009 | Fujii et al. | 60/39.281 |
| 2005/0000222 A1 * | 1/2005 | Inoue et al. | 60/776 |
| 2008/0083225 A1 * | 4/2008 | Fish et al. | 60/772 |

FOREIGN PATENT DOCUMENTS

| | | | |
|---|---|---|---|
| JP | 59-119116 A | 7/1984 | |
| JP | 2000-171038 A | 6/2000 | |
| JP | 2001-141243 A | 5/2001 | |
| JP | 2001-329860 A | 11/2001 | |
| JP | 2005-321157 A | 11/2005 | |
| JP | 200825910 A * | 2/2008 | 60/737 |

OTHER PUBLICATIONS

International Search Report for PCT/JP2008/057139, mailing date of Jul. 15, 2008.

* cited by examiner

*Primary Examiner* — Phutthiwat Wongwian
(74) *Attorney, Agent, or Firm* — Westerman, Hattori, Daniels & Adrian, LLP

(57) ABSTRACT

In a gas turbine combustor, a cavity with which a plurality of first air passages communicates is formed by covering with a cover a concave portion of a top hat main body in which the first air passages are formed along the circumferential direction of the top hat main body, a plurality of second fuel passages that communicates with the first fuel passages are formed by connecting an inner ring and an outer ring to the top hat main body and by connecting the inner ring and the outer ring to each other, a peg is fixed on the inner ring to communicate with the second fuel passage through a third air passage, and thin wall portions that serve as a thermal elongation absorbing unit by which thermal elongation is absorbed are provided on the inner ring and the outer ring.

5 Claims, 9 Drawing Sheets

GAS TURBINE COMBUSTOR

TECHNICAL FIELD

The present invention relates to a gas turbine combustor that can produce uniform air fuel mixture by providing a top hat fuel line in a main fuel line to reduce emission level of nitric oxides (NOx) in a gas turbine in which compressed air is mixed with fuel, the mixture is burned to produce combustion gas, and the combustion gas is provided to the turbine to produce rotative power.

BACKGROUND ART

A gas turbine includes, for example, a compressor, a combustor, and a turbine. The compressor compresses air taken in through an air intake to produce compressed air that is at high temperature and high pressure. In the combustor, the compressed air is mixed with fuel, and the mixture is burned to produce combustion gas at high temperature and high pressure. The combustion gas is provided to the turbine to produce rotative power, thereby driving a generator connected to the turbine. The turbine is so configured that a plurality of stator vanes and a plurality of rotor blades are alternately arranged in a casing thereof. The combustion gas drives the rotor blades, thereby rotatively driving an output shaft to which the generator is connected. After driving the turbine, the combustion gas is converted into static pressure by a diffuser of an exhaust casing, and then, is released into the atmosphere.

FIG. 14 is a schematic view of a conventional gas turbine combustor. In a conventional gas turbine combustor, a casing is, as shown in FIG. 14, configured so that a combustor inner tube 002 is supported in the interior of a combustor outer casing 001 and that a combustor transition piece 003 is connected to a tip end portion of the combustor inner tube 002. An air passage 004 is formed between the combustor outer casing 001 and the combustor inner tube 002. In the interior of the combustor inner tube 002, a pilot nozzle 005 is arranged in the center thereof, a plurality of main fuel nozzles 006 is arranged on the inner circumference of the combustor inner tube 001 along the circumferential direction thereof, and a main burner 007 is arranged around the pilot nozzle 005 so that a tip end portion of each main fuel nozzle 006 communicates with the main burner 007. A plurality of top hat nozzles 008 is arranged on the inner circumference of the combustor outer casing 001 along the circumferential direction thereof, and a fuel passage 009 is connected to each top hat nozzle 008.

A pilot fuel line 010 is connected to the pilot nozzle 005, a main fuel line 011 is connected to the main fuel nozzles 006, and a top hat fuel line 012 is connected to the top hat nozzles 008.

Thus, airflow of the compressed air compressed by the compressor that is at high temperature and high pressure flows into the air passage 004 of the gas turbine combustor, and then, is mixed with fuel injected by the top hat nozzles 008. The air fuel mixture flows into the interior of the combustor inner tube 002. In the interior of the combustor inner tube 002, the main burner 007 mixes the air fuel mixture and fuel injected by the main fuel nozzles 006 with each other to produce premixed gas, and then, swirl flow of the premixed gas flows into the interior of the transition piece 003. The air fuel mixture is mixed with fuel injected by the pilot nozzle 005. The mixture thus produced is ignited by a pilot flame (not shown) and is burned to produce combustion gas. The combustion gas is ejected to the interior of the transition piece 003. Some of the combustion gas is ejected into the interior of the transition piece 003 so as to be diffused peripherally accompanying flame. Consequently, the combustion gas is ignited by the premixed gas that flows to the interior of the transition piece 003 from the main fuel nozzle 006, and is burned. Thus, because of diffused flame produced by pilot fuel injected by the pilot nozzle 005, flame is held to stably burn dilute premixed fuel injected by the main fuel nozzles 006.

Such a gas turbine is described, for example, in Patent Documents 1 and 2.

Patent Document 1: Japanese Patent Application Laid-open No. 2001-141243

Patent Document 2: Japanese Patent Application Laid-open No. 2000-171038

DISCLOSURE OF INVENTION

Problem to be Solved by the Invention

In the conventional gas turbine combustor, fuel is injected from the top hat nozzles 008 to airflow of the compressed air to produce air fuel mixture, and fuel is injected to the air fuel mixture by the main fuel nozzles 006 to produce premixed gas. Thus, uniform air fuel mixture is formed, thereby reducing emission level of NOx. Here, fuel passages 009 that provide fuel from the top hat fuel line 012 to the top hat nozzles 008 are required to be formed in the combustor outer casing 001. Typically, a concave portion is formed on the combustor outer casing 001 along the circumferential direction thereof, and a cover is fixed on the concave portion to form a fuel cavity. A plurality of fuel passages 009 is formed in the combustor outer casing 001 from the fuel cavity so as to be communicated with the top hat nozzles 008. Two rings each having different diameters are fit to each other, and thus, each fuel passage 009 is formed therebetween.

In such a configuration, however, heat stress works on the two rings included in each fuel passage 009 when the gas turbine combustor is in operation. Therefore, strength thereof is degraded. More specifically, when the gas turbine combustor is started, the combustor outer casing 001 is heated from inside and thus, heat expansion occurs therein. Therefore, an inner ring situated on the side with a higher temperature is expanded due to heat, and thus, compression stress works on the inner ring. On the other hand, stretching stress works on an outer ring situated on the side with a lower temperature. As a result, stress concentration occurs in welded portions of the rings. When repeatedly starting up and stopping the gas turbine combustor, damages such as a crack may occur in the welded portions of the rings.

The present invention is directed to solving the problem. An object of the present invention is to provide a gas turbine combustor whose life is extended by reducing stress that works on joining portions of the top hat portion.

Means for Solving Problem

According to an aspect of the present invention, a gas turbine combustor includes: a combustor outer casing; a combustor inner tube that is arranged within the combustor outer casing via an air passage; a top hat portion to which the combustor outer casing and the combustor inner tube are connected; a plurality of top hat nozzles that is arranged on the top hat portion along a circumferential direction of the top hat portion; a pilot nozzle that is arranged in a center area of the combustor inner tube; and a plurality of premix nozzles that is arranged on an inner circumference of the combustor inner tube along a circumferential direction of the combustor inner tube so as to surround the pilot nozzle. The top hat portion includes: a top hat main body that has a cylindrical shape and a plurality of first fuel passages formed therein along an axial direction of the top hat main body; a cover that forms a cavity communicating with the first fuel passages by covering a concave portion formed on the top hat main body; an inner ring and an outer ring that form a second fuel passage communicating with the first fuel passages by being connected to the top hat main body and being connected to each other; a fuel injecting unit being fixed to the inner ring to communicate with the second fuel passage through a third fuel passage; and a thermal elongation absorbing unit that is provided on at least one of the inner ring and the outer ring to absorb thermal elongation.

Advantageously, in the gas turbine combustor, the thermal elongation absorbing unit includes a thin wall portion that is formed on at least one of the inner ring and the outer ring.

Advantageously, in the gas turbine combustor, the thermal elongation absorbing unit includes a gap having a predetermined length that communicates with the second fuel passage.

Advantageously, in the gas turbine combustor, the thermal elongation absorbing unit includes a slit formed on one of the inner ring and the outer ring such that the slit is spaced from the second fuel passage.

Advantageously, in the gas turbine combustor, in the thermal elongation absorbing unit, the outer ring is made of a material with a higher coefficient of linear expansion of material than that of the inner ring.

Advantageously, in the gas turbine combustor, a mounting flange is formed on the top hat main body to mount the top hat main body on the combustor outer casing, and a hollow portion communicating with the first fuel passages is formed in the mounting flange.

Advantageously, in the gas turbine combustor, a mounting flange is formed on the top hat main body to mount the top hat main body on the combustor outer casing, and a cutout portion that is open to an outer circumference of the mounting flange is formed in the mounting flange.

Effect of the Invention

In a gas turbine combustor according to an embodiment of the present invention, a top hat portion thereof includes a top hat main body that has a cylindrical shape and on which a plurality of first fuel passages is formed along the axial direction thereof, a cover that forms, by covering a concave portion formed on the top hat main body, a cavity with which the first fuel passages communicate, an inner ring and an outer ring that are connected to the top hat main body and to each other to form a second air passage that communicates with the first air passages, a fuel injecting unit that communicates with the second air passage via a third air passage by being fixed to the inner ring, and a thermal elongation absorbing unit formed in at least one of the inner ring and the outer ring. A temperature difference between the inside and the outside of the top hat portion causes heat expansion in either the inner ring or the outer ring, and thus, compression stress works thereon. Then, the thermal elongation unit absorbs the thermal expansion, whereby stress concentration on joining portions of the rings is reduced. As a result, damages such as a crack can be prevented. Consequently, life of the gas turbine combustor can be extended.

In a gas turbine combustor according to an embodiment of the present invention, a thin wall is formed in at least one of the inner ring and the outer ring as the thermal elongation absorbing unit. Therefore, when heat expansion occurs in the inner ring or the outer ring and compression stress works thereon, the thin wall portion is deformed, thereby absorbing the thermal elongation. Thus, stress concentration on joining portions of the rings can be reduced. As a result, damages such as a crack can be prevented.

In a gas turbine combustor according to an embodiment of the present invention, a gap is provided that has a predetermined length and that communicates with the second air passage. Therefore, when heat expansion occurs in the inner ring or the outer ring and compression stress works thereon, deformation of each ring can be reduced because of the gap, and thus, stress concentration on joining portions of the rings can be reduced. As a result, damages such as a crack can be prevented.

In a gas turbine combustor according to an embodiment of the present invention, a slit that serves as a thermal elongation absorbing unit is formed in one of the inner ring and the outer ring so that the slit is spaced from the second air passage. Therefore, when heat expansion occurs in the inner ring or the outer ring and compression stress works thereon, deformation of each ring can be prevented because of the slit. Thus, stress concentration on joining portions of the rings can be reduced. As a result, damages such as a crack can be prevented.

In a gas turbine combustor according to an embodiment of the present invention, the thermal elongation absorbing unit is configured by making the coefficient of linear expansion of material from which the outer rings made larger than the coefficient of linear expansion of material from which the inner ring is made. Therefore, when heat expansion occurs in the inner ring and compression stress works thereon, the outer ring made from the material having the larger coefficient of linear expansion is deformed, thereby absorbing the thermal elongation. Thus, stress concentration on joining portions of the rings can be reduced. As a result, damages such as a crack can be prevented.

In a gas turbine combustor according to an embodiment of the present invention, a mounting flange by which the top hat main body is mounted on the combustor outer casing is formed on the top hat main body, and within the mounting flange, a hollow portion is formed that communicates with the first fuel passages. Therefore, when heat expansion occurs in the inner ring or the outer ring and compression stress works thereon, a flange portion is deformed, thereby absorbing the thermal elongation. Thus, stress concentration on joining portions of the rings can be reduced. As a result, damages such as a crack can be prevented.

In a gas turbine combustor according to an embodiment of the present invention, a mounting flange by which the top hat main body is mounted on the combustor outer casing is formed on the top hat main body, and within the mounting flange, a cutout portion is formed that is open to the outer circumference thereof. Therefore, when heat expansion occurs in the inner ring or the outer ring and compression stress works thereon, a flange portion is deformed because of the cutout portion, thereby absorbing the thermal elongation. Thus, stress concentration on joining portions of the rings can be reduced. As a result, damages such as a crack can be prevented.

Figure 1:
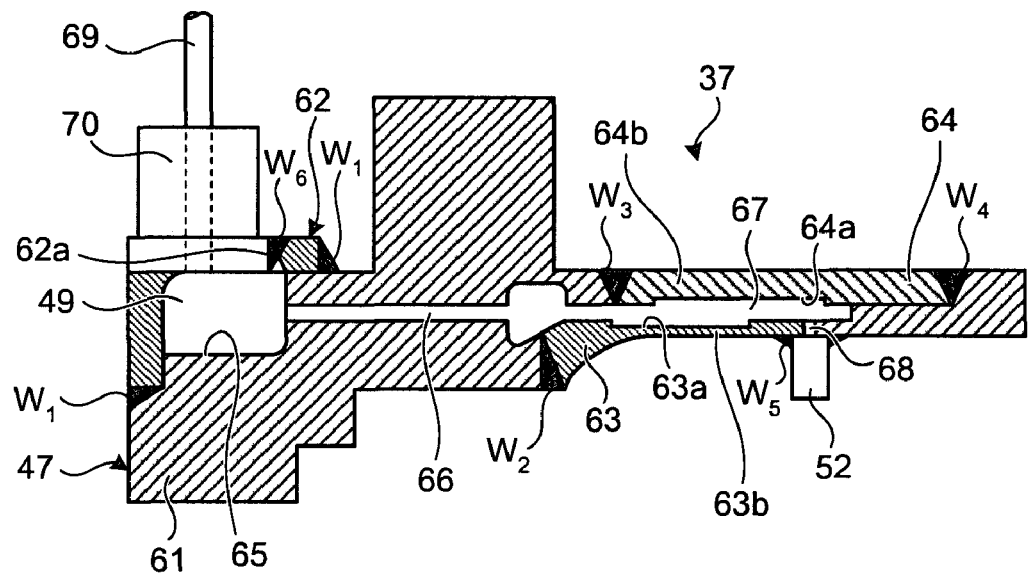
FIG. 1 is a sectional view of a top hat portion of a gas turbine combustor according to a first embodiment of the present invention.

EXPLANATIONS OF LETTERS OR NUMERALS 11 compressor
12 combustor
13 turbine
14 exhaust chamber
31 combustor outer casing
32 combustor inner tube
33 combustor transition piece
34 pilot nozzle
35 main fuel nozzle
37 top hat nozzle
47 top hat portion
49 fuel cavity
50 fuel passage
52 peg (fuel injecting unit)
61, 101, 111 top hat main body
62 cover
63, 71, 81 inner ring
63b thin wall portion (thermal elongation absorbing unit)
64, 72, 82 outer ring
64b thin wall portion (thermal elongation absorbing unit)
66, 102, 112 first fuel passage
67 second fuel passage
68 third fuel passage
73 gap (thermal elongation absorbing unit)
83 slit (thermal elongation absorbing unit)
91 inner ring (thermal elongation absorbing unit)
92 outer ring (thermal elongation absorbing unit)
101a, 111a mounting flange
104 hollow portion
113 cutout portion
$W_1, W_2, W_3, W_4, W_5, W_6$ welded portion (joining portion)

BEST MODE(S) FOR CARRYING OUT THE INVENTION

Exemplary embodiments of a gas turbine combustor according to the present invention are described in detail below with reference to the accompanying drawings. The present invention is not, however, limited thereto.

First Embodiment

Figure 2:
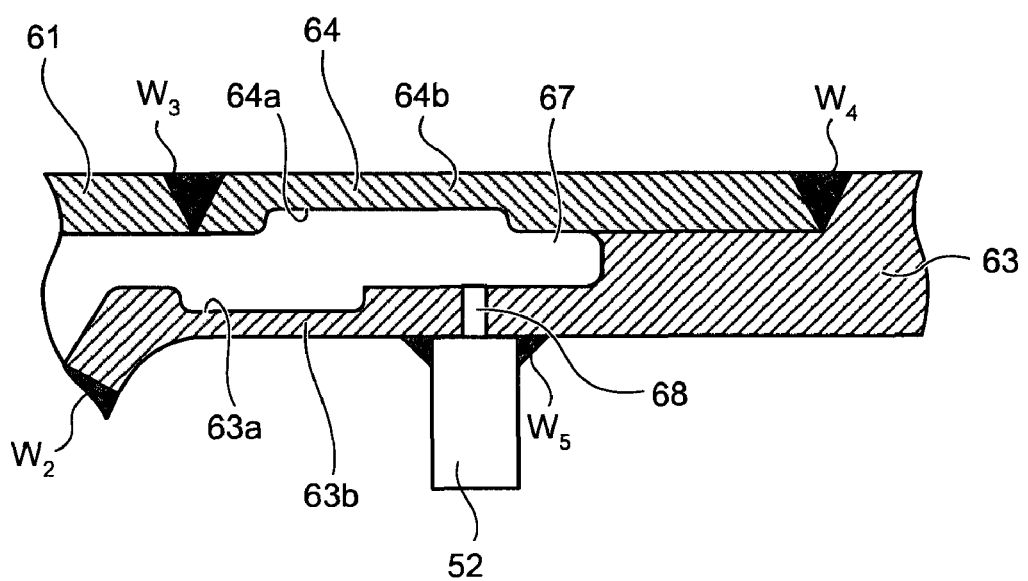
FIG. 2 is an enlarged view of a main portion of the top hat portion of the gas turbine combustor according to the first embodiment.
Figure 3:
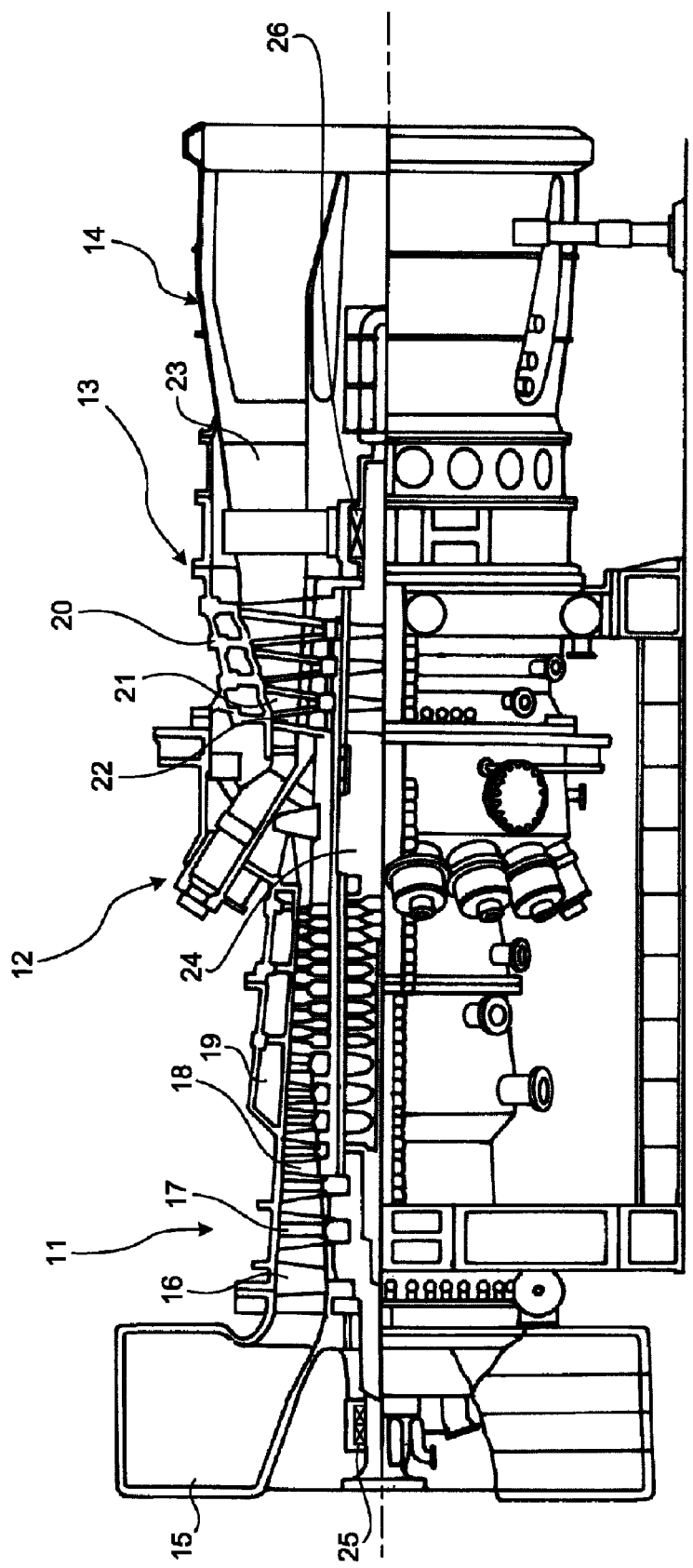
FIG. 3 is a schematic of a configuration of a gas turbine according to the first embodiment.
Figure 4:
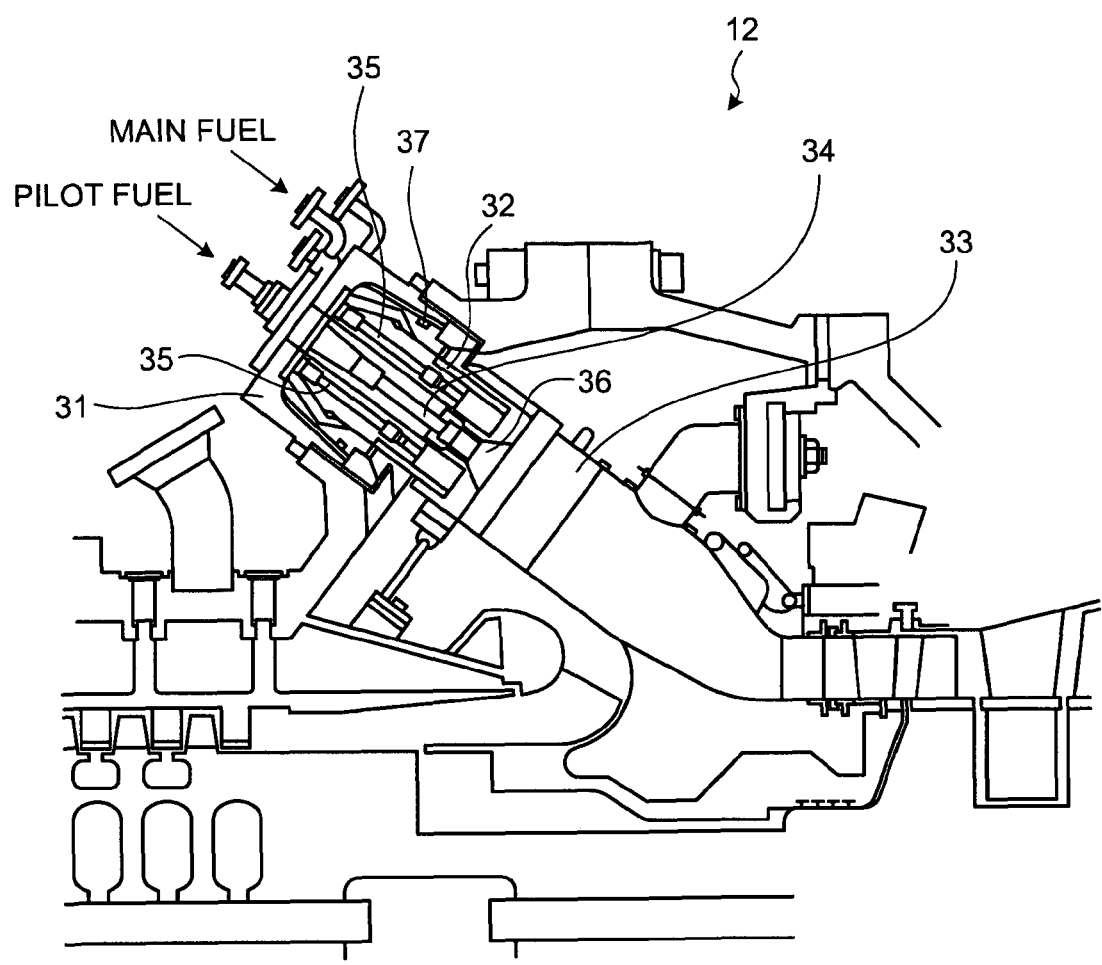
FIG. 4 is a schematic of a configuration of the gas turbine combustor according to the first embodiment.
Figure 5:
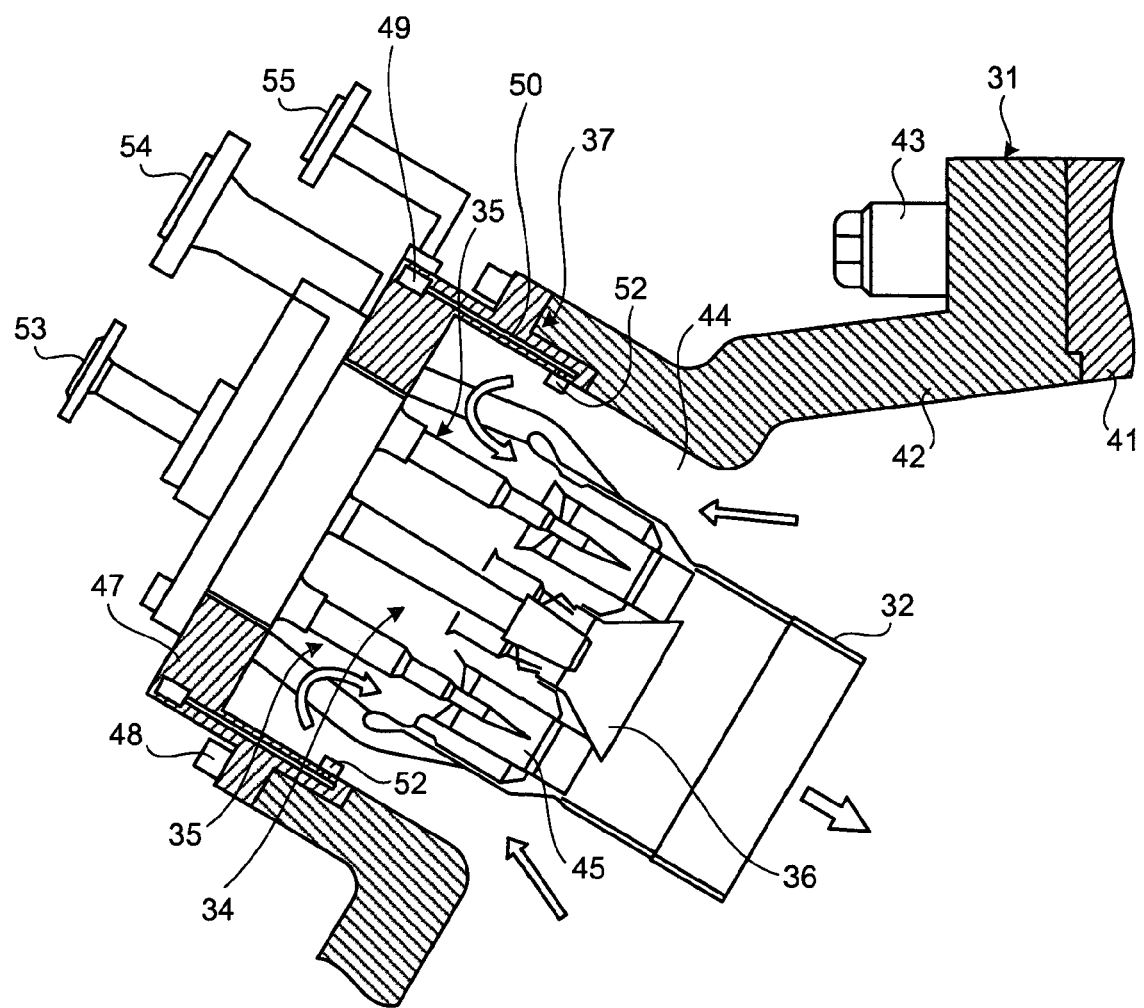
FIG. 5 is a sectional view of a main portion of the gas turbine combustor according to the first embodiment.

FIG. 1 is a sectional view of a top hat portion of a gas turbine combustor according to a first embodiment of the present invention, FIG. 2 is an enlarged view of a main portion of the top hat portion of the gas turbine combustor according to the first embodiment, FIG. 3 is a schematic of a configuration of a gas turbine according to the first embodiment, FIG. 4 is a schematic of a configuration of the gas turbine combustor according to the first embodiment, and FIG. 5 is a sectional view of a main portion of the gas turbine combustor according to the first embodiment.

The gas turbine according to the first embodiment includes, as shown in FIG. 3, a compressor 11, a combustor (gas turbine combustor) 12, a turbine 13, and an exhaust chamber 14. A generator (not shown) is connected to the turbine 13. The compressor 11 includes an air intake 15 through which air is taken in. In the interior of a compressor casing 16, a plurality of stator vanes 17 and a plurality of rotor blades 18 are alternately provided. An extracting manifold 19 is provided outside the compressor casing 16. The combustor 12 provides compressed air compressed by the compressor 11 with fuel so that the mixture can be burned by being ignited by a burner. The turbine 13 is configured so that a plurality of stator vanes 21 and a plurality of rotor blades 22 are alternately arranged in a turbine casing 20. The exhaust chamber 14 includes an exhaust diffuser 23 continued from the turbine 13. A rotor (turbine shaft) 24 is positioned so as to pass through the centers of the compressor 11, the combustor 12, the turbine 13, and the exhaust chamber 14. The end of the rotor on the side of the compressor 11 is rotatably supported by a bearing 25, and the end thereof on the side of the exhaust chamber 14 is rotatably supported by a bearing 26. A plurality of disk plates is fixed on the rotor 24, and the rotor blades 18 and 22 are connected thereto. The end of the rotor 24 on the side of the exhaust chamber 14 is connected to a generator (not shown).

Thus, while air taken in through the air intake 15 passes through the stator vanes 21 and the rotor blades 22, the air is compressed to produce compressed air that is at high temperature and high pressure. The compressed air is mixed with a prescribed fuel in the combustor 12, and the mixture is burned. Combustion gas at high temperature and high pressure, that is, working fluid produced in the combustor 12, passes through the stator vanes 21 and the rotor blades 22 included in the turbine 13, and thus, the combustion gas rotates the rotor 24, thereby driving the generator connected to the rotor 24. Meanwhile, exhaust gas is converted into static pressure by the exhaust diffuser 23 of the exhaust chamber 14, and then, is released into the atmosphere.

In the combustor 12, as shown in FIG. 4, a combustor casing is configured so that a combustor inner tube 32 is supported in an interior of a combustor outer casing 31 with a predetermined distance therebetween and that a combustor transition piece 33 is connected to a tip end portion of the combustor inner tube 32. In the interior of the combustor inner tube 32, a pilot nozzle 34 is arranged in the center thereof, and a plurality of main fuel nozzles (premix nozzle) 35 is arranged on the inner circumference of the combustor inner tube 32 along the circumferential direction thereof so as to surround the pilot nozzle 34. A pilot corn 36 is mounted on a tip end portion of the pilot nozzle 34. A plurality of top hat nozzles 37 is arranged on the inner circumference of the combustor outer casing 31 along the circumference direction thereof.

More specifically, as shown in FIG. 5, the combustor outer casing 31 is configured so that an outer casing cover portion 42 closely contacts the basal portion of an outer casing main body 41 being fastened by a plurality of fastening bolds 43. A basal portion of the combustor inner tube 32 is fit into the outer casing cover portion 42, and thus, an air passage 44 is formed between the outer casing cover portion 42 and the combustor inner tube 32. In the interior of the combustor inner tube 32, the pilot nozzle 34 is arranged in the center thereof, and the main fuel nozzles 35 are arranged so as to surround the pilot nozzle 34. Tip end portions of the main fuel nozzles 35 communicate with a main burner 45.

A top hat portion 47 fits into the outer casing cover portion 42 and is fastened by a plurality of fastening bolts 48. The top hat nozzles 37 are provided in the top hat portion 47. More specifically, a fuel cavity 49 is formed in the basal portion of the top hat portion 47 along the circumferential direction thereof. A plurality of fuel passages 50 is formed from the fuel cavity 49 in the direction of the tip end thereof. Pegs 52 are connected to tip end portions of the fuel passages 50.

A pilot fuel line (not shown) is connected to a fuel port 53 of the pilot nozzle 34, a main fuel line is connected to a fuel port 54 of the main fuel nozzles 35, and a top hat fuel line is connected to a fuel port 55 of the top hat nozzles 37.

Thus, as shown in FIGS. 4 and 5, compressed air that is at high temperature and high pressure flows into the air passage 44, and then, the compressed air is mixed with fuel injected by the top hat nozzles 37. The air fuel mixture flows into the interior of the combustor inner tube 32. In the interior of the combustor inner tube 32, the air fuel mixture is mixed by the main burner 45 with fuel injected by the main fuel nozzle 35 to produce swirl flow of premixed gas. The swirl flow flows into the transition piece 33. The air fuel mixture is also mixed with fuel injected by the pilot nozzle 34, and then, the mixture is ignited by a pilot flame (not shown) and is burned to produce combustion gas. The combustion gas is ejected to the interior of the transition piece 33. Here, some of the combustion gas is ejected into the interior of the transition piece 33 so as to be diffused peripherally accompanying flame. Consequently, the combustion gas is ignited by the premixed gas that flows into the interior of the transition piece 33 from the main fuel nozzles 35, and is burned. Thus, because of diffused flame produced by pilot fuel injected by the pilot nozzle 34, flame can be held to stably burn dilute premixed fuel injected by the main fuel nozzles 35.

The top hat portion 47 including the top hat nozzles 37 according to the present embodiment are described in detail below. The top hat portion 47 includes, as shown in FIGS. 1 and 2, a top hat main body 61, a cover 62, an inner ring 63, an outer ring 64, and the pegs (fuel injecting unit) 52.

The top hat main body 61 has a cylindrical shape, and a concave portion 65 is formed in a corner of the basal portion thereof (that is, the left end in FIG. 1) along the circumferential direction thereof. A plurality of first fuel passages 66 is formed in the axial direction of the top hat main body 61 along the circumferential direction thereof. The cover 62 whose cross section is L shaped is fixed to the top hat main body 61 by a welded portion $W_1$ so as to cover the concave portion 65, and thus, the fuel cavity 49 is provided in the top hat portion 47 along the circumferential direction thereof. The inner ring 63 and the outer ring 64 are connected to the tip end portion of the top hat main body 61 (that is, the right end in FIG. 1) by welded portions $W_2$ and $W_3$ and the inner ring 63 and the outer ring 64 are connected to each other by a welded portion $W_4$.

Thus, second fuel passages 67 are formed between the inner ring 63 and the outer ring 64 so that the second fuel passages 67 communicate with the first fuel passages 66. A plurality of third fuel passages 68 is formed in the inner ring 63 along the radial direction thereof so that the third fuel passages 68 communicate with the second fuel passages 67. The pegs 52 are fixed on the inner circumference of the inner ring 63 by welded portions $W_5$ so that the pegs 52 communicate with the third fuel passages 68. The fuel passages 50 include the first, the second, and the third fuel passages 66, 67, and 68.

A boss portion 70 is fixed to a tip end portion of a fuel pipe 69 included in the top hat fuel line. Meanwhile, a connecting hole 62a is formed on the outer circumference side of the cover 62, the boss portion 70 of the fuel pipe 69 fits into the connecting hole 62a of the cover 62, and the boss portion 70 is fixed to the cover 62 by a welded portion $W_6$.

In the present embodiment, thermal elongation absorbing units by which thermal elongation is absorbed are provided in the inner ring 63 and the outer ring 64. More specifically, grooves 63a and 64a are formed on the surfaces of the inner ring 63 and the outer ring 64 that oppose each other, that is, the surfaces that form the second fuel passages 67. Thus, thin wall portions 63b and 64b are formed therein that serve as the thermal elongation absorbing units.

When the gas turbine is started, the top hat portion 47 (combustor outer casing 31) is heated from inside and heat expansion occurs therein. The inner ring 63 situated on the side with a higher temperature extends in the axial direction of the inner ring 63. Thus, compression stress works on the welded portion $W_2$. Meanwhile, the outer ring 64 situated on the side with a lower temperature does not extend in the axial direction thereof in an early stage, whereby stretching stress works on the welded portions $W_3$ and $W_4$. In the present embodiment, however, the thin wall portion 63b is formed in the inner ring 63, and thus, rigidity thereof is degraded in the area in which the thin wall portion 63b is formed. Therefore, because the thin wall portion 63b can be deformed, thermal elongation of the inner ring 63 can be absorbed. Consequently, stress concentration on the welded portions $W_2$, $W_3$, and $W_4$ due to heat stress can be reduced.

When the gas turbine is stopped, the top hat portion 47 (combustor outer casing 31) is cooled from inside, and shrinks. Thus, the inner ring 63 situated on the side with a lower temperature shrinks in the axial direction of the inner ring 63. Consequently, stretching stress works on the welded portion $W_2$. Meanwhile, the outer ring 64 situated on the side with a higher temperature does not shrink in an early stage, whereby compression stress works on the welded portions $W_3$ and $W_4$. In the present invention, however, the thin wall portion 64b is formed in the outer ring 64, and thus, a rigidity thereof is degraded in the area in which the thin wall portion 64b is formed. Therefore, because the thin wall portion 64b is deformed, thermal elongation of the outer ring 64 can be absorbed. Consequently, stress concentration on the welded portions $W_2$, $W_3$, and $W_4$ due to heat stress can be reduced.

Thus, in the gas turbine combustor according to the first embodiment, the top hat portion 47 having the top hat nozzles 37 is configured so that the cavity 49 with which the first fuel passages 66 communicate is formed by covering the concave portion 65 with the cover 62 in the top hat main body 61 that has a cylindrical shape and in which the first fuel passages 66 in the axial direction thereof are formed along the circumferential direction thereof, the second fuel passages 67 that communicate with the first fuel passages 66 are formed by connecting the inner ring 63 and the outer ring 64 to the top hat main body 61 and by connecting the inner ring 63 and the outer ring 64 with each other, and the pegs 52 fixed to the inner ring 63 communicate with the second fuel passages 67 through the third fuel passages 68. Moreover, the thin wall portions 63b and 64b are formed in the inner ring 63 and the outer ring 64 as the thermal elongation absorbing units by which the thermal elongation is absorbed.

Therefore, when the gas turbine is started, the thermal elongation of the inner ring 63 is absorbed by the deformation of the thin wall portion 63b. Meanwhile, when the gas turbine is stopped, the thermal elongation of the outer ring 64 is absorbed by deformation of the thin wall portion 64b. Consequently, stress concentration on the welded portions $W_2$, $W_3$, and $W_4$ due to heat stress can be reduced. As a result, stress concentration on the joining portions of the rings 63 and 64 can be reduced by appropriately absorbing the thermal elongation due to a temperature difference between the inside and the outside of the top hat portion 47, and thus damages such as a crack can be reduced. Consequently, life of the gas turbine combustor can be extended.

In the gas turbine combustor according to the first embodiment, the grooves 63a and 64a are formed on the surfaces of the inner ring 63 and the outer ring 64 that forms the second fuel passages 67, thereby forming the thin wall portions 63b and 64b as the thermal elongation absorbing units. Therefore, when heat expansion occurs in the inner ring 63 or the outer ring 64 and compression stress works thereon, the thin wall portion 63b or 64b is deformed, and thus, the thermal elongation thereof can be absorbed. Consequently, stress concentration on the joining portions of the rings 63 and 64 can be reduced. As a result, damages such as a crack can be prevented.

In the first embodiment, the grooves 63a and 64a are formed on the surfaces of the inner ring 63 and the outer ring 64 that forms the second fuel passages 67, thereby forming the thin wall portions 63b and 64b as the thermal elongation absorbing units. Instead, grooves may be formed on the outer surfaces of the inner ring 63 and the outer ring 64, thereby forming the thin wall portions as the thermal elongation absorbing units.

Second Embodiment

Figure 6:
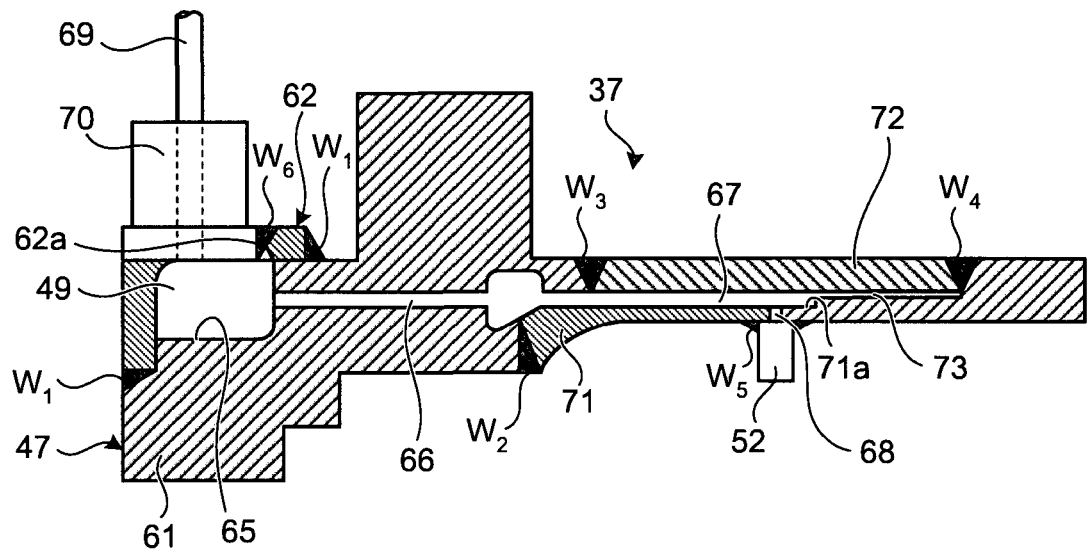
FIG. 6 is a sectional view of a top hat portion of a gas turbine combustor according to a second embodiment of the present invention.

FIG. 6 is a sectional view of a top hat portion of a gas turbine combustor according to a second embodiment of the present invention. Similar reference numerals are used to indicate members that achieve functions similar to those of the first embodiment, and duplicating descriptions are omitted.

In the gas turbine combustor according to the second embodiment, as shown in FIG. 6, the top hat portion 47 having the top hat nozzles 37 includes the top hat main body 61, the cover 62, an inner ring 71, an outer ring 72, and the pegs 52. More specifically, in the top hat main body 61, the concave portion 65 is formed in the basal portion of the top hat main body 61 along the circumferential direction thereof, and the first fuel passages 66 are formed along the axial direction thereof. The cover 62 is fixed by the welded portion $W_1$ on the top hat main body 61 so as to cover the concave portion 65, thereby providing the fuel cavity 49 therein. The inner ring 71 and the outer ring 72 are connected to the tip end portion of the top hat main body 61 by the welded portions $W_2$ and $W_3$, and the inner ring 71 and the outer ring 72 are connected to each other on the side of the tip end portion of the top hat main body 61 by the welded portion $W_4$. Thus, the second fuel passages 67 are formed between the inner ring 71 and the outer ring 72 so that the first fuel passages 66 communicate with the second fuel passages 67. The third fuel passages 68 are formed in the inner ring 71 so that the third fuel passages 68 communicate with the second fuel passages 67. The pegs 52 are fixed on the inner circumference of the inner ring 71 by the welded portions $W_5$ so that the pegs 52 communicate with the third fuel passages 68.

In the present embodiment, thermal elongation absorbing units by which thermal elongation is absorbed are provided in the inner ring 71 and the outer ring 72. More specifically, the inner ring 71 and the outer ring 72 are connected to each other, thereby forming the second fuel passages 67 therebetween. Moreover, a groove 71a is formed on the surface of the inner ring 71 that opposes the outer ring 72, thereby forming gaps 73 having a predetermined length and serving as the thermal elongation absorbing units, in which the gaps 73 communicate with the second fuel passages 67. Lengths of the inner ring 71 and the outer ring 72 in the axial direction of the rings are set to be long enough, and the welded portion $W_4$ is provided at a position closer from the tip end potion with respect to the gaps 73. Thus, a distance between the welded portions $W_3$ and $W_4$ is set to be long. The length between the welded portions $W_3$ and $W_4$ is set, for example, according to a relationship between a primary stress (pressure) and a heat stress (thermal elongation) while the gas turbine is in operation.

When the gas turbine is started, the top hat portion 47 is heated from inside and heat expansion occurs therein. Thus, the inner ring 71 situated on the side with a higher temperature extends in the axial direction of the inner ring 71. Consequently, compression stress works on the welded portion $W_2$. Meanwhile, the outer ring 72 situated on the side with a lower temperature does not extend in the axial direction of the outer ring 72 in an early stage, whereby stretching stress works on the welded portions $W_3$ and $W_4$. In the present embodiment, however, a length between the welded portions $W_3$ and $W_4$ is set to be a predetermined length. Thus, deformation of the inner ring 71 due to the thermal elongation can be reduced. The gaps 73 are provided between the inner ring 71 and the outer ring 72, and thus, the inner ring 71 can be prevented from directly pressing the outer ring 72. Consequently, stress concentration on the welded portions $W_2$, $W_3$, and $W_4$ due to heat stress can be reduced.

When the gas turbine is stopped, the top hat portion 47 is cooled from inside, and shrinks. Thus, the inner ring 71 situated on the side with a lower temperature shrinks in the axial direction of the inner ring 71. Consequently, stretching stress works on the welded portion $W_2$. Meanwhile, the outer ring 72 situated on the side with a higher temperature does not shrink in the axial direction of the outer ring 72 in an early stage, whereby compressing stress works on the welded portions $W_3$ and $W_4$. In the present embodiment, however, a length between the welded portions $W_3$ and $W_4$ is set to be a predetermined length. Therefore, deformation of the outer ring 72 due to the thermal elongation can be reduced. Further, the gaps 73 are provided between the inner ring 71 and the outer ring 72. Therefore, the outer ring 72 can be prevented from directly pressing the inner ring 71. Consequently, stress concentration on the welded portions $W_2$, $W_3$, and $W_4$ due to heat stress can be reduced.

Thus, in the gas turbine combustor according to the second embodiment, the top hat portion 47 having the top hat nozzles 37 is configured so that the cavity 49 with which the first fuel passages 66 communicate is formed by covering the concave portion 65 with the cover 62 in the top hat main body 61 that has a cylindrical shape and in which the first fuel passages 66 in the axial direction thereof are formed along the circumferential direction thereof, the second fuel passages 67 that communicate with the first fuel passages 66, are formed by connecting the inner ring 71 and the outer ring 72 to the top hat main body 61 and by connecting the inner ring 71 and the outer ring 72 with each other, and the pegs 52 fixed to the inner ring 71 communicate with the second fuel passages 67 through the third fuel passages 68. Further, a length between the welded portions $W_3$ and $W_4$ is set to be a predetermined length, and the gaps 73 are provided between the inner ring 71 and the outer ring 72 as the thermal elongation absorbing units by which the thermal elongation is absorbed.

Therefore, when the gas turbine is started, the thermal elongation of the inner ring 71 is absorbed by the gaps 73. Meanwhile, when the gas turbine is stopped, the thermal elongation of the outer ring 72 is absorbed by the gaps 73. Consequently, stress concentration on the welded portions $W_2$, $W_3$, and $W_4$ due to heat stress can be reduced. As a result, stress concentration on the joining portions of the rings 71 and 72 can be reduced by appropriately absorbing the thermal elongation due to a temperature difference between the inside and the outside of the top hat portion 47, and thus, damages such as a crack can be prevented. Consequently, life of the gas turbine combustor can be extended.

In the gas turbine combustor according to the second embodiment, the groove 71a is formed on the surface of the inner ring 71 that opposes the outer ring 72, and thus, the gaps 73 having a predetermined length that serve as the thermal elongation absorbing units are formed so that the gaps 73 communicate with the second fuel passages 67. Therefore, when heat expansion occurs in the inner ring 71 or the outer ring 72, and compression stress works thereon, the thermal elongation is absorbed by the gaps 73. Consequently, stress concentration on the joining portions of the rings 71 and 72 can be reduced. As a result, damages such as a crack can be prevented.

In the second embodiment, the groove 71a is formed on the surface of the inner ring 71 that opposes the outer ring 72. Thus, the gaps 73 that serve as the thermal elongation absorbing units are formed so that the gaps 73 communicate with the second fuel passages 67. Instead, a groove may be formed on the surface of the outer ring 72 that opposes the inner ring 71, thereby forming gaps that serve as the thermal elongation units having a predetermined length so that the gaps communicate with the second fuel passages 67.

Third Embodiment

Figure 7:
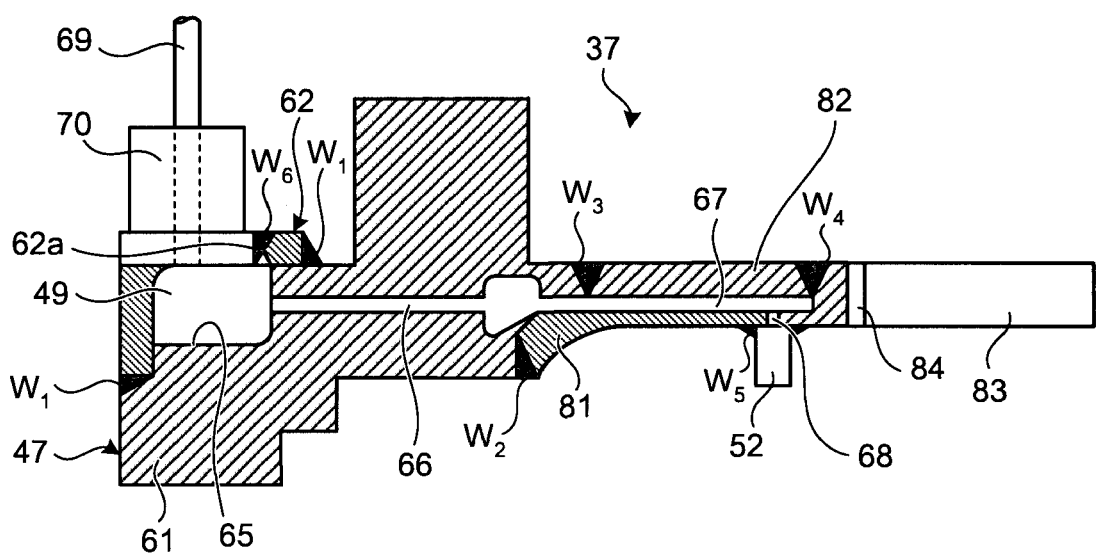
FIG. 7 is a sectional view of a top hat portion of a gas turbine combustor according to a third embodiment of the present invention.
Figure 8:
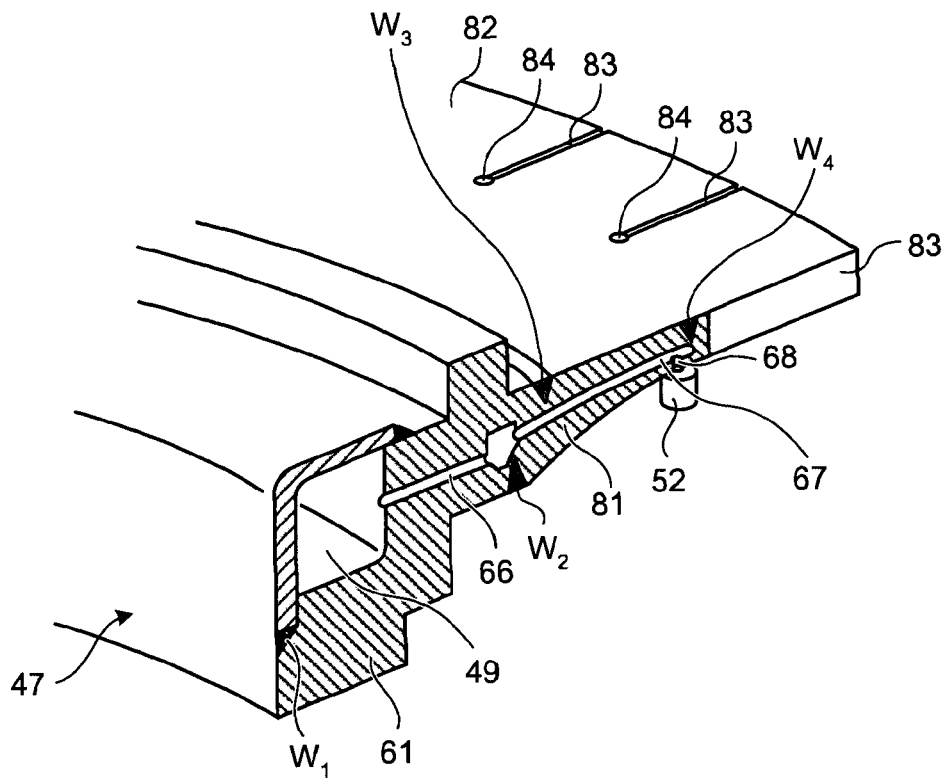
FIG. 8 is a schematic of the top hat portion of the gas turbine combustor according to the third embodiment.

FIG. 7 is a sectional view of a top hat portion of a gas turbine combustor according to a third embodiment of the present invention, and FIG. 8 is a schematic of the top hat portion of the gas turbine combustor according to the third embodiment. Similar reference numerals are used to indicate members that achieve functions similar to those of the embodiments described above, and duplicating descriptions are omitted.

In the gas turbine combustor according to the third embodiment, as shown in FIGS. 7 and 8, the top hat portion 47 including the top hat nozzles 37 includes the top hat main body 61, the cover 62, an inner ring 81, an outer ring 82, and the pegs 52. More specifically, in the top hat main body 61, the concave portion 65 is formed in the basal portion of the top hat main body 61 along the circumferential direction thereof, and the first fuel passages 66 are formed along the axial direction of the top hat main body 61. The cover 62 is fixed on the top hat main body 61 so as to cover the concave portion 65 by the welded portion $W_1$, thereby providing the fuel cavity 49 therein. The inner ring 81 and the outer ring 82 are connected to the tip end portion of the top hat main body 61 by the welded portions $W_2$ and $W_3$, and the inner ring 81 and the outer ring 82 are connected to each other on the side of the tip end portion of the top hat main body 61 by the welded portion $W_4$. Thus, the second fuel passages 67 are formed between the inner ring 81 and the outer ring 82 so that the first fuel passages 66 communicate with the second fuel passages 67. The third fuel passages 68 are formed in the inner ring 81 so that the third fuel passages 68 communicate with the second fuel passages 67. The pegs 52 are fixed on inner circumference of the inner ring 81 by the welded portions $W_5$ so that the pegs 52 communicate with the third fuel passages 68.

In the present embodiment, the thermal elongation absorbing units by which thermal elongation is absorbed are provided in the inner ring 81 and the outer ring 82. More specifically, the inner ring 81 and the outer ring 82 are connected to each other, thereby forming the second fuel passages 67 between the inner ring 81 and outer ring 82. A plurality of slits 83 that serves as the thermal elongation absorbing units is formed in the inner ring 81 on the side of the tip end portion thereof so that the slits 83 are spaced from the second fuel passages 67. The slits 83 are formed in the inner ring 81 along the axial direction thereof in an area closer to the tip end of the inner ring 81 with respect to the welded portion $W_4$. End holes 84 are formed at the ends of the slits 83. The slits 83 are provided at a predetermined interval along the circumferential direction of the inner ring 81.

When the gas turbine is started, the top hat portion 47 is heated from inside and heat expansion occurs therein. Thus, the inner ring 71 situated on the side with a higher temperature extends in the axial direction of the inner ring 71. Consequently, compression stress works on the welded portion $W_2$. Meanwhile, the outer ring 72 situated on the side with a lower temperature does not extend in the axial direction of the outer ring 72 in an early stage, whereby stretching stress works on the welded portions $W_3$ and $W_4$. In the present embodiment, however, the slits 83 are formed in the tip end portion of the inner ring 81 so that the slits 83 are spaced from the second fuel passages 67. Thus, the peripheries of the slits 83 are deformed in the axial and the circumferential directions thereof, thereby absorbing the thermal elongation of the inner ring 81. Consequently, stress concentration on the welded portions $W_2$, $W_3$, and $W_4$ due to heat stress can be reduced.

Thus, in the gas turbine combustor according to the third embodiment, the top hat portion 47 having the top hat nozzles 37 is configured so that the cavity 49 with which the first fuel passages communicate is formed by covering the concave portion 65 with the cover 62 in the top hat main body 61 that has a cylindrical shape and in which the first fuel passages 66 in the axial direction thereof are formed along the circumferential direction thereof, the second fuel passages 67 that communicate with the first fuel passages 66 are formed by connecting the inner ring 81 and the outer ring 82 to the top hat main body 61 and by connecting the inner ring 81 and the outer ring 82 to each other, and the pegs 52 fixed to the inner ring 81 communicate with the second fuel passages 67 through the third fuel passages 68. Moreover, the slits 83 are formed in the tip end portion of the inner ring 81 so that the slits 83 are spaced from the second fuel passages 67.

Therefore, when the gas turbine is started, the thermal elongation of the inner ring 81 is absorbed by the slits 83. Consequently, stress concentration on the welded portions $W_2$, $W_3$, and $W_4$ due to heat stress can be reduced. As a result, stress concentration on the joining portions of the rings 81 and 82 can be reduced by appropriately absorbing the thermal elongation due to a temperature difference between the inside and the outside of the top hat portion 47, and thus damages such as a crack can be prevented. Consequently, life of the gas turbine combustor can be extended.

In the gas turbine combustor according to the third embodiment, the slits 83 that serve as the thermal elongation absorbing units are formed in the tip end portion of the inner ring 81 so that the slits 83 are spaced from the second fuel passages 67. Therefore, when heat expansion occurs in the inner ring 81 or the outer ring 82 and compression stress works thereon, the thermal elongation is absorbed by the slits 83. Consequently, stress concentration on the joining portions of the rings 81 and 82 can be reduced. As a result, damages such as a crack can be prevented.

In the third embodiment, the slits 83 are formed in the tip end portion of the inner ring 81 so that the slits 83 are spaced from the second fuel passages 67, thereby providing the thermal elongation absorbing units. Instead, the slits may be provided therein by forming a groove in the outer ring 82, in which the groove is spaced from the second fuel passages 67.

Fourth Embodiment

Figure 9:
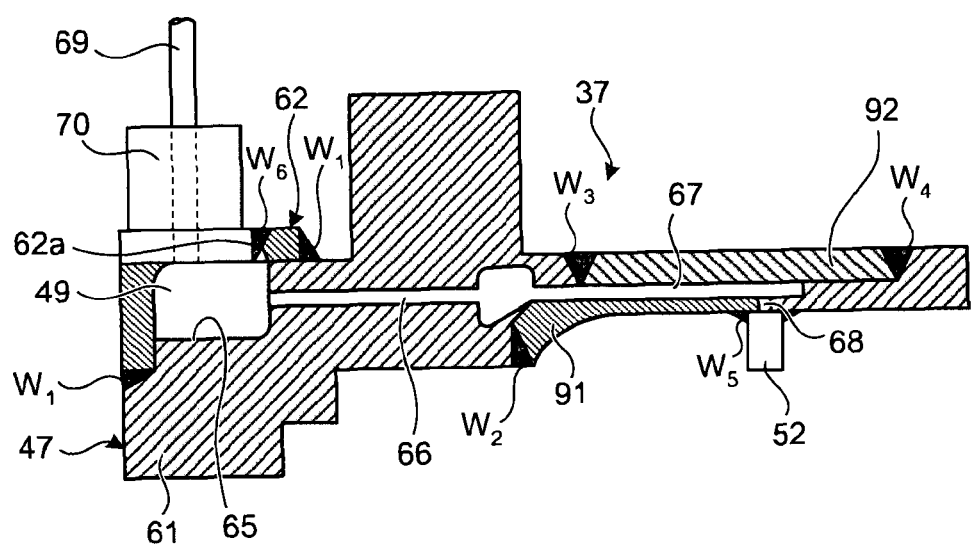
FIG. 9 is a sectional view of a top hat portion of a gas turbine combustor according to a fourth embodiment of the present invention.

FIG. 9 is a sectional view of a top hat portion of a gas turbine combustor according to a fourth embodiment of the present invention. Similar reference numerals are used to indicate members that achieve functions similar to those in the embodiments described above, and duplicating descriptions are omitted.

In the gas turbine combustor according to the fourth embodiment, as shown in FIG. 9, the top hat portion 47 including the top hat nozzles 37 includes the top hat main body 61, the cover 62, an inner ring 91, an outer ring 92, and the pegs 52. More specifically, in the top hat main body 61, the concave portion 65 is formed in the basal portion of the top hat main body 61 along the circumferential direction thereof, and the first fuel passages 66 are formed along the axial direction of the top hat main body 61. The cover 62 is fixed on the top hat main body 61 so as to cover the concave portion 65 by the welded portion $W_1$, thereby providing the fuel cavity 49 therein. The inner ring 91 and the outer ring 92 are connected to the tip end portion of the top hat main body 61 by the welded portions $W_2$ and $W_3$, and the inner ring 91 and the outer ring 92 are connected to each other on the side of the tip end portion of the top hat main body by the welded portion $W_4$. Thus, the second fuel passages 67 are formed between the inner ring 91 and the outer ring 92 so that the first fuel passages 66 communicate with the second fuel passages 67. The third fuel passages 68 are formed in the inner ring 91 so that the third fuel passages 68 communicate with the second fuel passages 67. The pegs 52 are fixed on inner circumference of the inner ring 91 by the welded portions $W_5$ so that the pegs 52 communicate with the third fuel passages 68.

In the present embodiment, the thermal elongation absorbing units by which thermal elongation is absorbed are provided in the inner ring 91 and the outer ring 92. More specifically, a coefficient of linear expansion of material from which the outer ring 92 is made is set to be larger than a coefficient of linear expansion of material from which the inner ring 91 is made from, thereby forming the thermal elongation absorbing units.

When the gas turbine is started, the top hat portion 47 is heated from inside and heat expansion occurs therein. Thus, the inner ring 91 situated on the side with a higher temperature extends in the axial direction of the inner ring 91. Consequently, compression stress works on the welded portion $W_2$. Meanwhile, the outer ring 92 situated on the side with a lower temperature does not extend in the axial direction of the outer ring 92 in an early stage, whereby stretching stress works on the welded portions $W_3$ and $W_4$. In the present embodiment, however, a coefficient of linear expansion of the material from which the outer ring 92 is made is larger than a coefficient of linear expansion of the material from which the inner ring 91 is made. Therefore, the thermal elongation of the inner ring 91 is absorbed, making the amounts of the thermal elongation of the inner ring 91 and the outer ring 92 generally equal to each other. Consequently, stress concentration on the welded portions $W_2$, $W_3$, and $W_4$ due to heat stress can be reduced.

Thus, in the gas turbine combustor according to the fourth embodiment, the top hat portion 47 having the top hat nozzles 37 is configured so that the cavity 49 with which the first fuel passages communicate is formed by covering the concave portion 65 with the cover 62 in the top hat main body 61 that has a cylindrical shape and in which the first fuel passages 66 in the axial direction thereof are formed along the circumferential direction thereof, the second fuel passages 67 that communicate with the first fuel passages 66 are formed by connecting the inner ring 91 and the outer ring 92 to the top hat main body 61 and by connecting the inner ring 91 and the outer ring 92 to each other, and the pegs 52 fixed to the inner ring 91 communicate with the second fuel passages 67 through the third fuel passages 68. Moreover, a coefficient of linear expansion of the material from which the outer ring 92 is made is larger than a coefficient of linear expansion of the material from which the inner ring 91 is made.

Therefore, when the gas turbine is started, the thermal elongation of the inner ring 91 is absorbed. Consequently, stress concentration on the welded portions $W_2$, $W_3$, and $W_4$ due to heat stress can be reduced. As a result, stress concentration on the joining portions of the rings 91 and 92 can be reduced by appropriately absorbing the thermal elongation due to a temperature difference between the inside and the outside of the top hat portion 47, and thus damages such as a crack can be prevented. Consequently, life of the gas turbine combustor can be extended.

In the fourth embodiment, the thermal elongation absorbing unit is provided by making a coefficient of linear expansion of the material from which the outer ring 92 is made larger than a coefficient of linear expansion of the material from which the inner ring 91 is made, so that the thermal elongation can be absorbed when the gas turbine is started. Instead, a coefficient of the material from which the inner ring 91 is made may be, however, set to be larger than a coefficient of linear expansion of the material from which the outer ring 92 is made. Then, the thermal elongation can be absorbed when the gas turbine is stopped.

Fifth Embodiment

Figure 10:
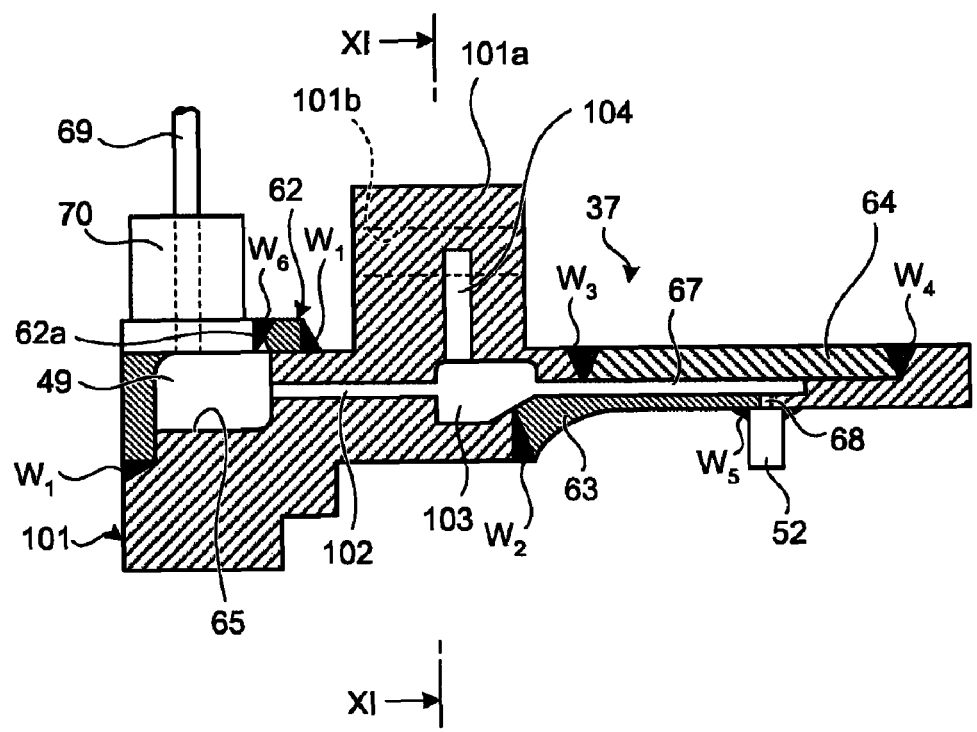
FIG. 10 is a sectional view of a top hat portion of a gas turbine combustor according to a fifth embodiment of the present invention.
Figure 11:
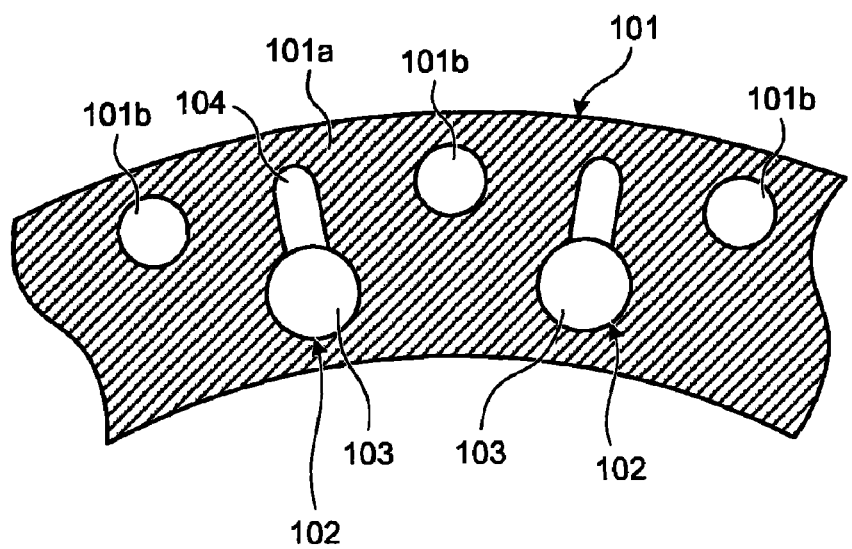
FIG. 11 is a sectional view cut along the line XI-XI in FIG. 10.

FIG. 10 is a sectional view of a top hat portion of a gas turbine combustor according to a fifth embodiment of the present invention, and FIG. 11 is a sectional view cut along the line XI-XI in FIG. 10. Similar reference numerals are used to indicate members that achieve functions similar to those of the embodiments described above, and duplicating descriptions are omitted.

In the gas turbine combustor according to the fifth embodiment, as shown in FIGS. 10 and 11, the top hat portion 47 having the top hat nozzles 37 according to the present embodiment includes a top hat main body 101, the cover 62, the inner ring 63, the outer ring 64, and the pegs 52. More specifically, in the top hat main body 101, the concave portion 65 is formed in a basal portion of the top hat main body 101 along the circumferential direction thereof, and a plurality of first fuel passages 102 is formed along the axial direction thereof. The cover 62 is fixed on the top hat main body 101 so as to cover the concave portion 65 by the welded portion $W_1$, thereby providing the fuel cavity 49 therein. The inner ring 63 and the outer ring 64 are connected to the tip end portion of the top hat main body 101 by the welded portions $W_2$ and $W_3$ and the inner ring 63 and the outer ring 64 are connected to each other by the welded portion $W_4$. Thus, the second fuel passages 67 are formed between the inner ring 63 and the outer ring 64 so that the second fuel passages 67 communicate with the first fuel passages 102. The third fuel passages 68 are formed in the inner ring 63 so that the third fuel passages 68 communicate with the second fuel passages 67. The pegs 52 are fixed on the inner circumference of the inner ring 63 by the welded portions $W_5$ so that the pegs 52 communicate with the third fuel passages 68. In the present embodiment, a mounting flange 101a that has a ring shape extending radially outward from an outer surface of the outer ring 64 and by which the top hat portion 47 is fixed on an outer casing cover portion (combustor outer casing) is integrally formed on the top hat main body 101. A plurality of mounting holes 101b through which the fastening bolts pass is formed in the mounting flange 101a at a predetermined interval along the circumferential direction thereof. As described above, the first fuel passages 102 are formed in the top hat main body 101, and expanded portions 103 of which a passage area is expanded are formed at a position along the first fuel passages 102. Hollow portions 104 that communicate with the expanded portions 103 and that extend toward the side of the mounting flange 101a are formed in the mounting flange 101a.

When the gas turbine is started, the top hat portion 47 is heated from inside and heat expansion occurs therein. The inner ring 63 situated on the side with a higher temperature extends in the axial direction of the inner ring 63. Thus, compression stress works on the welded portion $W_2$. Meanwhile, the outer ring 64 situated on the side with a lower temperature does not extend in the axial direction thereof in an early stage, whereby stretching stress works on the welded portions $W_3$ and $W_4$. In the present embodiment, however, the hollow portions 104 that communicate with the expanded portions 103 of the first fuel passages 102 are formed in the mounting flange 101a of the top hat main body 101. Therefore, the temperature of the outer ring 64 rises in an early stage. Consequently, deformation of the inner ring 63 due to the thermal elongation can be reduced. As a result, stress concentration on the welded portions $W_2$, $W_3$, and $W_4$ due to heat stress can be reduced.

When the gas turbine is stopped, the top hat portion 47 is cooled from inside, and shrinks. Thus, the inner ring 63 situated on the side with a lower temperature shrinks in the axial direction of the inner ring 63. Consequently, stretching stress works on the welded portion $W_2$. Meanwhile, the outer ring 64 situated on the side with a higher temperature does not shrink in the axial direction of the outer ring 64 in an early stage, whereby compressing stress works on the welded portions $W_3$ and $W_4$. In the present embodiment, however, the hollow portions 104 that communicate with the expanded portions 103 of the first fuel passages 102 are formed in the mounting flange 101a of the top hat main body 101. Therefore, the temperature of the outer ring 64 drops in an early stage. Consequently, deformation of the outer ring 64 due to the thermal elongation can be reduced. As a result, stress concentration on the welded portions $W_2$, $W_3$, and $W_4$ due to heat stress can be reduced.

Thus, in the gas turbine combustor according to the fifth embodiment, the top hat portion 47 having the top hat nozzles 37 is configured so that the cavity 49 with which the first fuel passages communicate is formed by covering the concave portion 65 with the cover 62 in the top hat main body 101 that has a cylindrical shape and in which the first fuel passages 102 in the axial direction thereof are formed along the circumferential direction thereof, the second fuel passages 67 that communicate with the first fuel passages 102 are formed by connecting the inner ring 63 and the outer ring 64 to the top hat main body 101 and by connecting the inner ring 63 and the outer ring 64 to each other, and the pegs 52 fixed to the inner ring 63 communicate with the second fuel passages 67 through the third fuel passages 68. Moreover, the hollow portions 104 that communicate with the expanded portions 103 of the first fuel passages 102 are formed in the mounting flange 101a of the top hat main body 101.

Therefore, when the gas turbine is started or stopped, a difference between the amounts of thermal elongation of the inner ring 63 and the outer ring 64 is reduced. Consequently, stress concentration on the welded portions $W_2$, $W_3$, and $W_4$ due to heat stress can be reduced. As a result, stress concentration on the joining portions of the rings 63 and 64 can be reduced by appropriately absorbing the thermal elongation due to a temperature difference between the inside and the outside of the top hat portion 47, and thus damages such as a crack can be prevented. Consequently, life of the gas turbine combustor can be extended.

Sixth Embodiment

Figure 12:
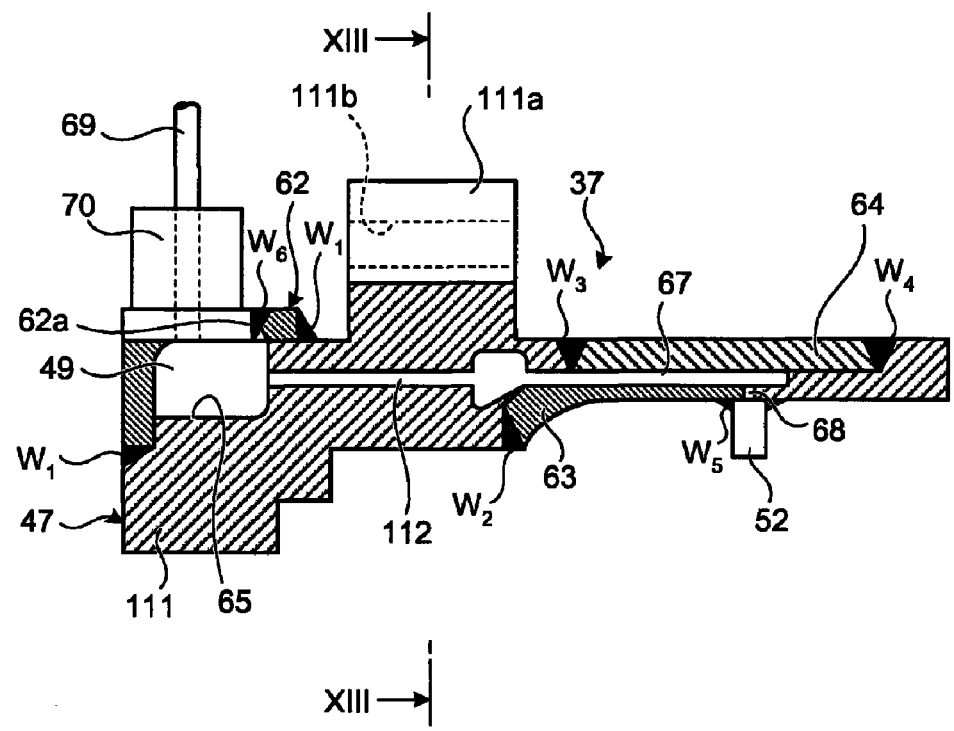
FIG. 12 is a sectional view of a top hat portion of a gas turbine combustor according to a sixth embodiment of the present invention.
Figure 13:
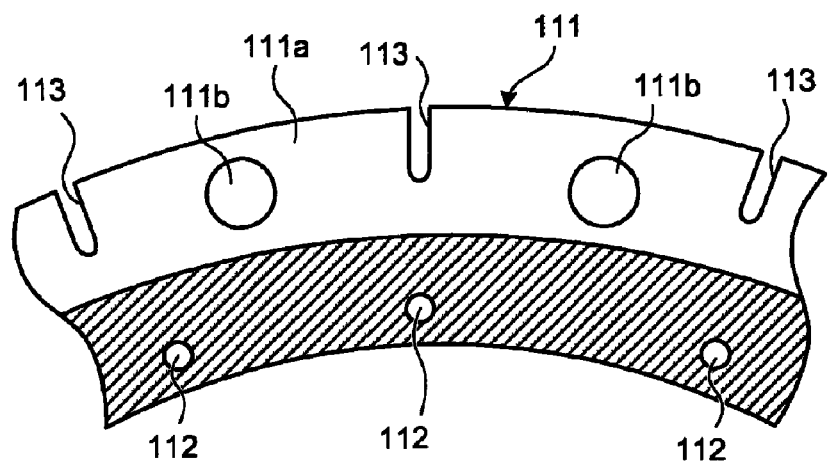
FIG. 13 is a sectional view cut along the line XIII-XIII in FIG. 12.
Figure 14:
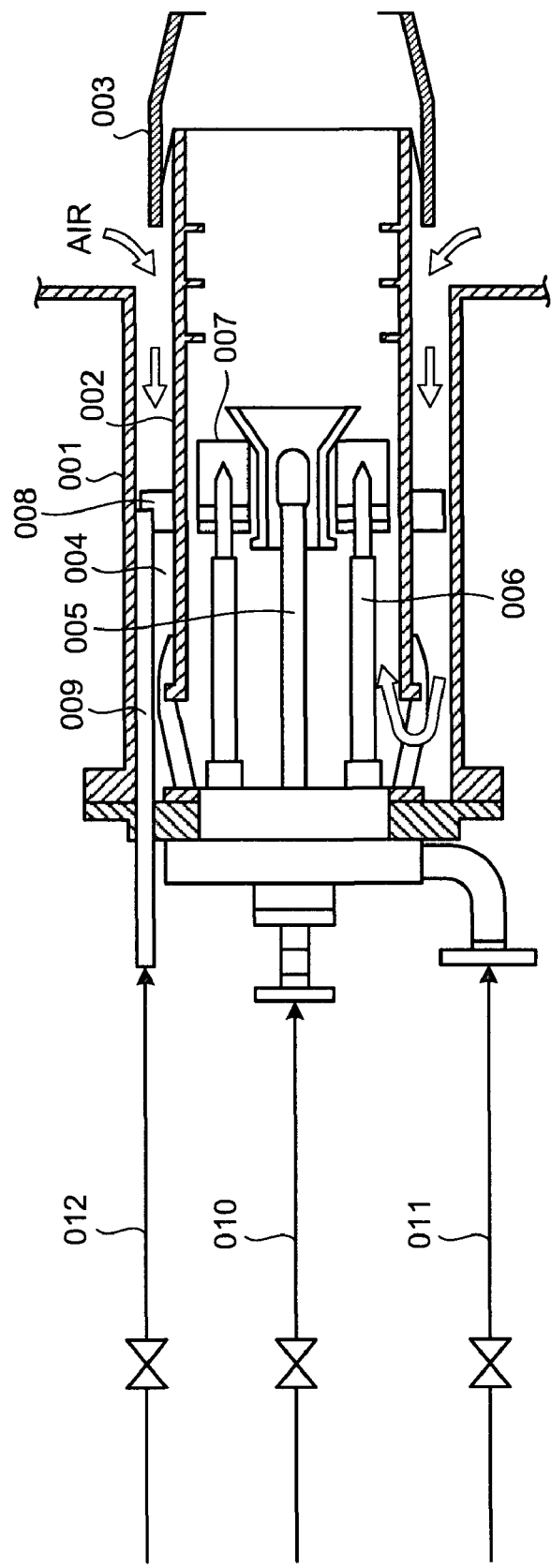
FIG. 14 is a schematic of a conventional gas turbine combustor.

FIG. 12 is a sectional view of a top hat portion of a gas turbine combustor according to a sixth embodiment of the present invention, and FIG. 13 is a sectional view cut along the line XIII-XIII in FIG. 12. Similar reference numerals are used to indicate members that achieve functions similar to those of the embodiments described above, and duplicating descriptions are omitted.

In the gas turbine combustor according to the sixth embodiment, as shown in FIGS. 12 and 13, the top hat portion 47 having the top hat nozzles 37 includes a top hat main body 111, the cover 62, the inner ring 63, the outer ring 64, and the pegs 52. More specifically, in the top hat main body 111, the concave portion 65 is formed in the basal portion of the top hat main body 111 along the circumferential direction thereof, and a plurality of first fuel passages 112 is formed along the axial direction thereof. The cover 62 is fixed on the top hat main body 111 so as to cover the concave portion 65 by the welded portion $W_1$, thereby providing the fuel cavity 49 therein. The inner ring 63 and the outer ring 64 are connected to the tip end portion of the top hat main body 111 by the welded portions $W_2$ and $W_3$ and the inner ring 63 and the outer ring 64 are connected to each other by the welded portion $W_4$. Thus, the second fuel passages 67 are formed between the inner ring 63 and the outer ring 64 so that the second fuel passages 67 communicate with the first fuel passages 112. The third fuel passages 68 are formed in the inner ring 63 so that the third fuel passages 68 communicate with the second fuel passages 67. The pegs 52 are fixed on the inner circumference of the inner ring 63 by the welded portions $W_5$ so that the pegs 52 communicate with the third fuel passages 68.

In the present embodiment, a mounting flange 111a that has a cylindrical shape and by which the top hat portion 47 is fixed on an outer casing cover portion (combustor outer casing) is integrally formed on the top hat main body 111. A plurality of mounting holes 111b through which fastening bolts pass is formed in the mounting flange 111a at a predetermined interval along the circumferential direction thereof. A plurality of cutout portions 113 that is open to the outer circumference of the mounting flange 111a is formed in the mounting flange 111a of the top hat main body 111 at a predetermined interval along the circumferential direction thereof. The cutout portions 113 may be provided in the mounting flange 111a so as to be positioned at every space between the mounting holes 111b or so as to be positioned at some of the spaces therebetween.

When the gas turbine is started, the top hat portion 47 is heated from inside and heat expansion occurs therein. The inner ring 63 situated on the side with a higher temperature extends in the axial direction of the inner ring 63. Thus, compression stress works on the welded portion $W_2$. Meanwhile, the outer ring 64 situated on the side with a lower temperature does not extend in the axial direction thereof in an early stage, whereby stretching stress works on the welded portions $W_3$ and $W_4$. In the present embodiment, however, the cutout portions 113 are formed in the mounting flange 111a of the top hat main body 111. Therefore, the temperature of the outer ring 64 rises in an early stage, and the mounting flange 111a is deformed in the circumferential direction thereof. Consequently, deformation of the inner ring 63 due to the thermal elongation can be reduced. As a result, stress concentration on the welded portions $W_2$, $W_3$, and $W_4$ due to heat stress can be reduced.

When the gas turbine is stopped, the top hat portion 47 is cooled from inside, and shrinks. Thus, the inner ring 63 situated on the side with a lower temperature shrinks in the axial direction of the inner ring 63. Consequently, stretching stress works on the welded portion $W_2$. Meanwhile, the outer ring 64 situated on the side with a higher temperature does not shrink in the axial direction of the outer ring 64 in an early stage, whereby compressing stress works on the welded portions $W_3$ and $W_4$. In the present embodiment, however, the cutout portions 113 are formed in the mounting flange 111a of the top hat main body 111. Therefore, the temperature of the outer ring 64 drops in an early stage, and the mounting flange 111a is deformed in the circumferential direction thereof. Consequently, deformation of the outer ring 64 due to the thermal elongation can be reduced. As a result, stress concentration on the welded portions $W_2$, $W_3$, and $W_4$ due to heat stress can be reduced.

Thus, in the gas turbine combustor according to the sixth embodiment, the top hat portion 47 having the top hat nozzles 37 is configured so that the cavity 49 with which the first fuel passages communicate is formed by covering the concave portion 65 with the cover 62 in the top hat main body 111 that has a cylindrical shape and in which the first fuel passages 112 in the axial direction thereof are formed along the circumferential direction thereof, that the second fuel passages 67 that communicate with the first fuel passages 112 are formed by connecting the inner ring 63 and the outer ring 64 to the top hat main body 111 and by connecting the inner ring 63 and the outer ring 64 to each other, and the pegs 52 fixed to the inner ring 63 communicate with the second fuel passages 67 through the third fuel passages 68. Moreover, the cutout portions 113 that are open to the outer circumference of the mounting flange 111a are formed in the mounting flange 111a of the top hat main body 111.

Therefore, when the gas turbine is started or stopped, a difference between the amounts of thermal elongation of the inner ring 63 and the outer ring 64 is reduced. Consequently, stress concentration on the welded portions $W_2$, $W_3$, and $W_4$ due to heat stress can be reduced. As a result, stress concentration on the joining portions of the rings 63 and 64 can be reduced by appropriately absorbing the thermal elongation due to a temperature difference between the inside and the outside of the top hat portion 47, and thus damages such as a crack can be prevented. Consequently, life of the gas turbine combustor can be extended.

In the embodiments described above, the thermal elongation absorbing units by which thermal elongation is absorbed are provided on both of the inner rings 63, 71, 81, and 91 and the outer rings 64, 72, 82, and 92. Instead, the thermal elongation absorbing unit may be provided on one of: the inner rings 63, 71, 81, and 91; and the outer rings 64, 72, 82, and 92.

INDUSTRIAL APPLICABILITY

The gas turbine combustor according to the present invention is directed to extending life thereof by reducing stress that works on the joining portions of the top hat portion by absorbing thermal elongation, and can be applied to any kind of gas turbines.

The invention claimed is:

1. A gas turbine combustor comprising:
a combustor outer casing;
a combustor inner tube that is arranged within the combustor outer casing via an air passage;
a top hat portion to which the combustor outer casing and the combustor inner tube are connected;
a plurality of top hat nozzles that are arranged on the top hat portion along a circumferential direction of the top hat portion;
a pilot nozzle that is arranged in a center area of the combustor inner tube; and
a plurality of premix nozzles that are arranged on an inner circumference of the combustor inner tube along a circumferential direction of the combustor inner tube so as to surround the pilot nozzle, wherein
the top hat portion includes:
a top hat main body that has a cylindrical shape and a plurality of first fuel passages formed therein along an axial direction of the top hat main body;
a cover that forms a cavity communicating with the first fuel passages by covering a concave portion formed on the top hat main body;
an inner ring and an outer ring that form a second fuel passage communicating with the first fuel passages by being connected to the top hat main body and being connected to each other;
a fuel injecting unit being fixed to the inner ring to communicate with the second fuel passage through a third fuel passage; and
a thermal elongation absorbing unit that is provided on at least one of the inner ring and the outer ring to absorb thermal elongation,
wherein the thermal elongation absorbing unit includes a thin wall portion that is formed by a groove on at least one of the inner ring and the outer ring.

2. A gas turbine combustor comprising:
a combustor outer casing;
a combustor inner tube that is arranged within the combustor outer casing via an air passage;
a top hat portion to which the combustor outer casing and the combustor inner tube are connected;
a plurality of top hat nozzles that are arranged on the top hat portion along a circumferential direction of the top hat portion;
a pilot nozzle that is arranged in a center area of the combustor inner tube; and
a plurality of premix nozzles that are arranged on an inner circumference of the combustor inner tube along a circumferential direction of the combustor inner tube so as to surround the pilot nozzle, wherein
the top hat portion includes:
a top hat main body that has a cylindrical shape and a plurality of first fuel passages formed therein along an axial direction of the top hat main body;

a cover that forms a cavity communicating with the first fuel passages by covering a concave portion formed on the top hat main body;
an inner ring and an outer ring that form a second fuel passage communicating with the first fuel passages by being connected to the top hat main body and being connected to each other;
a fuel injecting unit being fixed to the inner ring to communicate with the second fuel passage through a third fuel passage; and
a thermal elongation absorbing unit that is provided on at least one of the inner ring and the outer ring to absorb thermal elongation,
wherein the thermal elongation absorbing unit includes a gap formed by a groove on a surface of the inner ring having a predetermined length that communicates with the second fuel passage.

3. A gas turbine combustor comprising:
a combustor outer casing;
a combustor inner tube that is arranged within the combustor outer casing via an air passage;
a top hat portion to which the combustor outer casing and the combustor inner tube are connected;
a plurality of top hat nozzles that are arranged on the top hat portion along a circumferential direction of the top hat portion;
a pilot nozzle that is arranged in a center area of the combustor inner tube; and
a plurality of premix nozzles that are arranged on an inner circumference of the combustor inner tube along a circumferential direction of the combustor inner tube so as to surround the pilot nozzle, wherein
the top hat portion includes:
a top hat main body that has a cylindrical shape and a plurality of first fuel passages formed therein along an axial direction of the top hat main body;
a cover that forms a cavity communicating with the first fuel passages by covering a concave portion formed on the top hat main body;
an inner ring and an outer ring that form a second fuel passage communicating with the first fuel passages by being connected to the top hat main body and being connected to each other;
a fuel injecting unit being fixed to the inner ring to communicate with the second fuel passage through a third fuel passage; and
a thermal elongation absorbing unit that is provided on at least one of the inner ring and the outer ring to absorb thermal elongation,
wherein the thermal elongation absorbing unit includes a slit formed on one of the inner ring and the outer ring such that the slit is spaced from the second fuel passage.

4. A gas turbine combustor comprising:
a combustor outer casing;
a combustor inner tube that is arranged within the combustor outer casing via an air passage;
a top hat portion to which the combustor outer casing and the combustor inner tube are connected;
a plurality of top hat nozzles that are arranged on the top hat portion along a circumferential direction of the top hat portion;
a pilot nozzle that is arranged in a center area of the combustor inner tube; and
a plurality of premix nozzles that are arranged on an inner circumference of the combustor inner tube along a circumferential direction of the combustor inner tube so as to surround the pilot nozzle, wherein
the top hat portion includes:
a top hat main body that has a cylindrical shape and a plurality of first fuel passages formed therein along an axial direction of the top hat main body;
a cover that forms a cavity communicating with the first fuel passages by covering a concave portion formed on the top hat main body;
an inner ring and an outer ring that form a second fuel passage communicating with the first fuel passages by being connected to the top hat main body and being connected to each other;
a fuel injecting unit being fixed to the inner ring to communicate with the second fuel passage through a third fuel passage; and
a thermal elongation absorbing unit that is provided on at least one of the inner ring and the outer ring to absorb thermal elongation,
wherein a mounting flange is formed on the top hat main body extending radially outward from an outer surface of the outer ring to mount the top hat main body on the combustor outer casing, and a hollow portion communicating with the first fuel passages is formed in the mounting flange.

5. A gas turbine combustor comprising:
a combustor outer casing;
a combustor inner tube that is arranged within the combustor outer casing via an air passage;
a top hat portion to which the combustor outer casing and the combustor inner tube are connected;
a plurality of top hat nozzles that are arranged on the top hat portion along a circumferential direction of the top hat portion;
a pilot nozzle that is arranged in a center area of the combustor inner tube; and
a plurality of premix nozzles that are arranged on an inner circumference of the combustor inner tube along a circumferential direction of the combustor inner tube so as to surround the pilot nozzle, wherein
the top hat portion includes:
a top hat main body that has a cylindrical shape and a plurality of first fuel passages formed therein along an axial direction of the top hat main body;
a cover that forms a cavity communicating with the first fuel passages by covering a concave portion formed on the top hat main body;
an inner ring and an outer ring that form a second fuel passage communicating with the first fuel passages by being connected to the top hat main body and being connected to each other;
a fuel injecting unit being fixed to the inner ring to communicate with the second fuel passage through a third fuel passage; and
a thermal elongation absorbing unit that is provided on at least one of the inner ring and the outer ring to absorb thermal elongation,
wherein a mounting flange is formed on the top hat main body to mount the top hat main body on the combustor outer casing, and a cutout portion that is open to an outer circumference of the mounting flange is formed in the mounting flange.

* * * * *